United States Patent [19]

Lynn et al.

[11] 3,807,592

[45] Apr. 30, 1974

[54] CAR TRUNK LOADER

[76] Inventors: Ray E. Lynn, 15172 Acacia, San Bernardino, Calif. 92407; Dwane P. Simmons, 7465 Olive Tree Ln., Highland, Calif. 92346

[22] Filed: Apr. 14, 1972

[21] Appl. No.: 244,066

Related U.S. Application Data

[62] Division of Ser. No. 51,115, June 30, 1970.

[52] U.S. Cl. .................................. 214/450, 214/85
[51] Int. Cl. .............................................. B60r 9/00
[58] Field of Search ........... 214/450, 451, 452, 453, 214/454, 85, 146.5; 224/29 R, 75 R

[56] References Cited
UNITED STATES PATENTS

| 3,115,978 | 12/1963 | Anderson, Jr. et al. | 214/450 |
| 2,534,156 | 12/1950 | Wyatt et al. | 214/84 |
| 2,247,128 | 6/1941 | Levey | 224/42.1 H |
| 3,627,158 | 12/1971 | Kobasic | 214/450 |

FOREIGN PATENTS OR APPLICATIONS

| 651,590 | 11/1962 | Canada | 214/450 |

Primary Examiner—Robert G. Sheridan
Assistant Examiner—Lawrence J. Oresky
Attorney, Agent, or Firm—Herbert E. Kidder

[57] ABSTRACT

Apparatus for loading heavy and/or unwieldy articles, such as folded-up wheel-chairs or the like, into car trunks, comprising a pair of laterally spaced tracks on the trunk floor, and a pallet having a pair of wheels at the front end that run on the tracks, and parallel tracks on the underside of the pallet in longitudinal alignment with said wheels. Mounted on the rear bumper of the car are two upstanding brackets having wheels at their upper ends that are spaced apart to run on the tracks on the pallet. Laterally extending limit stop projections on the brackets are engageable by rearwardly facing hooks on the underside of the pallet to limit the travel of the pallet when pulled rearwardly, and to serve as pivots for lowering the rear end of the pallet to the ground. When the loaded pallet is pushed forwardly or pulled rearwardly, the pallet rolls freely on its own two wheels at the front end, and on the wheels on the bumper brackets.

4 Claims, 13 Drawing Figures

CAR TRUNK LOADER

CROSS-REFERENCE TO RELATED APPLICATIONS

This application is a divsion of our pending application, Ser. No. 51,115, filed June 30, 1970, entitled INVALID CAR LIFT.

BACKGROUND OF THE INVENTION

This invention pertains to apparatus for loading heavy and/or unwieldy articles, such as folded-up wheel-chairs or the like, into the trunk of an automobile, and is particularly intended for use with the invalid car lift shown in our co-pending application, Ser. No. 51,115.

In the said application there is shown and described an apparatus for transferring wheel-chair invalids into and out of an automobile seat, which apparatus can be folded up and carried in the car trunk, along with the folded-up wheel-chair. The apparatus of the application is fairly light-weight and compact, and can be easily handled by the average woman without any trouble. The wheel-chair, on the other hand, is an entirely different matter, and most women would find it extremely difficult, if not impossible, to lift the folded wheel-chair up over the rear bumper of the automobile and reach forwardly with it to place it in the trunk. The present invention is concerned with apparatus for expediting the loading and unloading of a folded wheel-chair from the trunk of an automobile, so that it can be easily accomplished by any woman or individual of limited strength.

SUMMARY OF THE INVENTION

The primary object of the present invention is to provide an apparatus for conveniently and easily loading the folded-up wheel-chair into the car trunk, or unloading it therefrom, whereby even a relatively frail person of extremely limited strength can handle the loading and unloading of this relatively heavy and awkward load without difficulty. This object is achieved by means of a pallet having wheels at its front end which run on tracks in the trunk. For convenience, these tracks may be mounted on a removable platform, or panel, that merely rests on the floor of the trunk. The pallet is provided on its underside with rearwardly facing hooks that engage limit stop means mounted on the rear bumper when the said pallet has been drawn rearwardly as far as it is to go, and the said hooks and limit stops cooperate with pallet-supporting wheels on the bumper brackets to serve as pivots to lower the rear end of the pallet to the ground.

Other objects and advantages of the invention will become apparent to those skilled in the art from the following detailed description of the preferred embodiment thereof, with reference to the accompanying drawings.

DESCRIPTION OF THE PREFERRED EMBODIMENT

Figure 1:
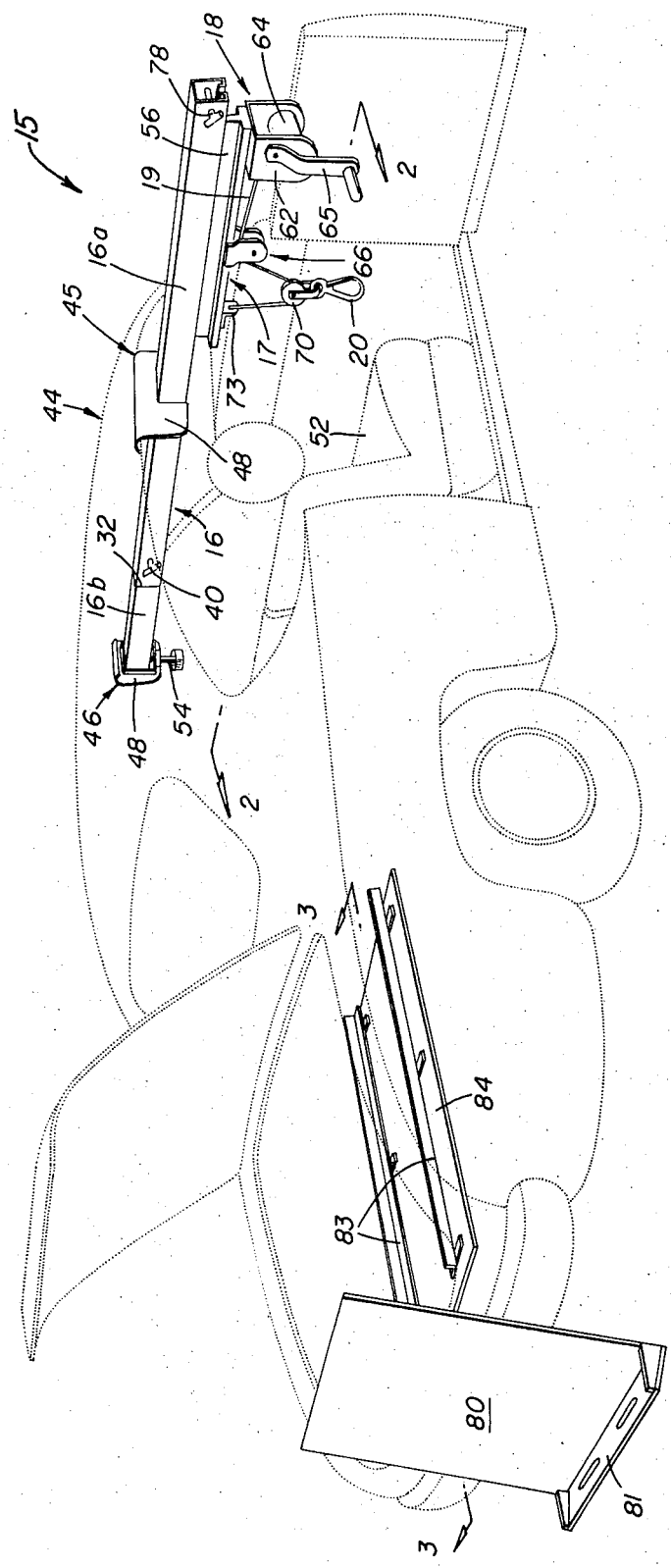
FIG. 1 is a perspective view of an automobile, as seen from behind on the right-hand side, showing the invalid-transfer apparatus of our prior application installed and ready to take an invalid, while the trunk-loading apparatus of the present invention is seen at the rear of the car.
Figure 2:
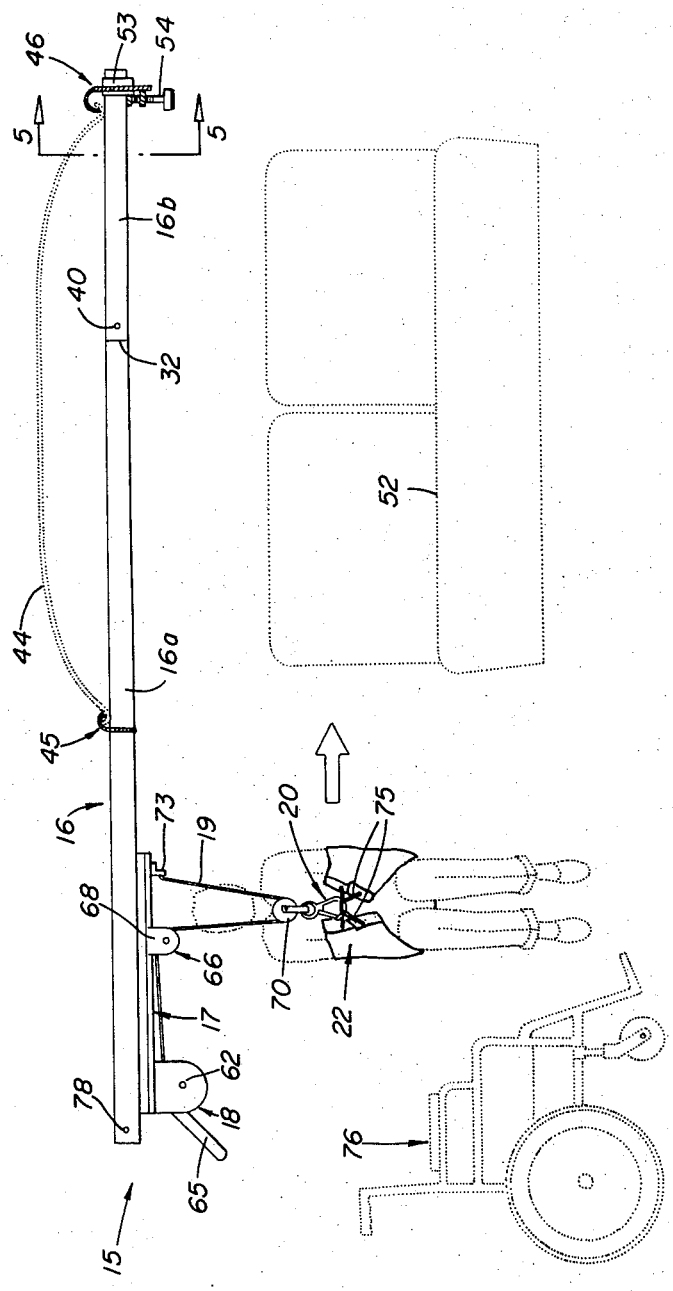
FIG. 2 is a transverse sectional view through the automobile, looking rearwardly at the section 2--2 in FIG. 1, showing the invalid lifted clear of the wheel-chair in readiness to be transferred into the car.

In FIGS. 1 to 8 of the drawings, the invalid car lift of the invention is designated in its entirety by the reference numeral 15 and comprises an overhead track 16, upon which a wheeled carriage 17 runs. Mounted on the carriage is a winch 18, to which a wire rope 19 is attached, and the latter raises and lowers a hook 20 that hooks onto a canvas sling 22, in which the invalid sits.

Figures 3, 4:
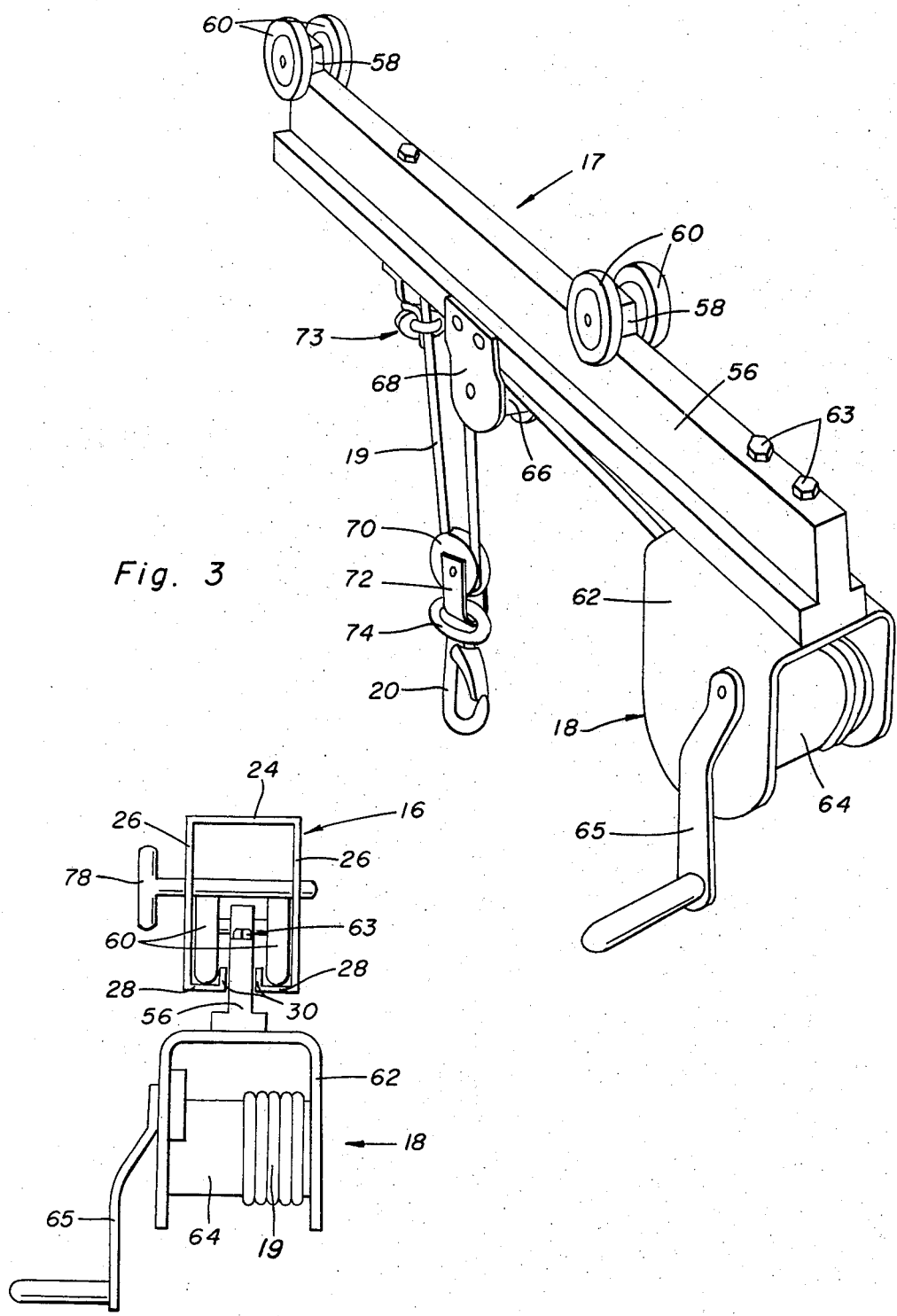
FIG. 3 is a perspective view of the wheeled carriage that runs on the overhead track.
FIG. 4 is an end view of the track, showing the wheeled carriage positioned on the track.
Figure 5:
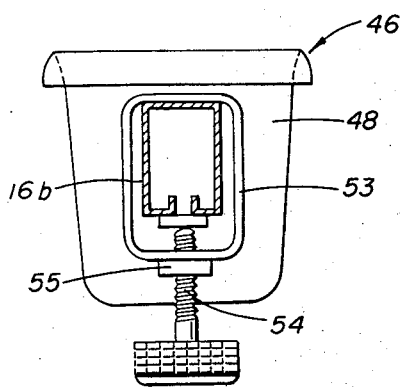
FIG. 5 is a sectional view taken at 5—5 in FIG. 2, but drawn to about four times the scale of the latter.
Figure 7:
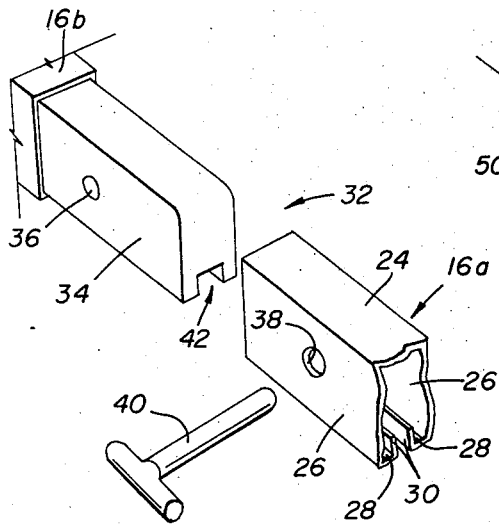
FIG. 7 is a fragmentary perspective view of the telescoping ends of the two sections of the track, showing how they are joined together.

The track 16 is preferably in the form of a straight, elongated steel beam of the cross-sectional configuration shown in FIG. 4, having a top wall 24, parallel side walls 26, inwardly turned track flanges 28, and upturned edges 30. The beam 16 is preferably made in two pieces so that it can be broken up into shorter lengths that can be stowed in the car trunk, one of the pieces being a relatively long section 16a, and the other a relatively short section 16b, which are joined together at 32. As best shown in FIG. 7, the joint 32 is made by a solid plug 34 which is inserted into the inner end of section 16b and projects therefrom, the said plug being solidly fixed to section 16b. The projecting end of the plug is inserted into the adjacent end of section 16a, and fits snugly therein. A transverse hole 36 in plug 34 registers with a corresponding hole 38 in opposite side walls 26 of section 16a, and a locking pin 40 is inserted through the aligned holes 36, 38 to lock the two sections 16a, 16b together. Plug 34 has substantially the same outside width and height dimensions as the inside of sections 16a and 16b, less a few thousandths to allow them to telescope together easily. A lengthwise-extending groove 42 in the underside of plug 34 provides clearance for the upturned edges 30 of sections 16a, 16b. Track section 16a is a length that will fit easily into the trunk of the car, and its length dimension can be varied to suit the length of the trunk compartment of different cars.

Figure 6:
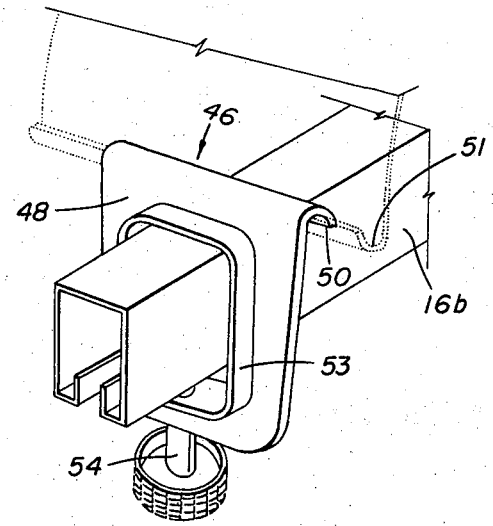
FIG. 6 is a perspective view of the outer end of the track on the left-hand side of the automobile, showing the manner of securing the track to the rain gutter.
Figure 8:
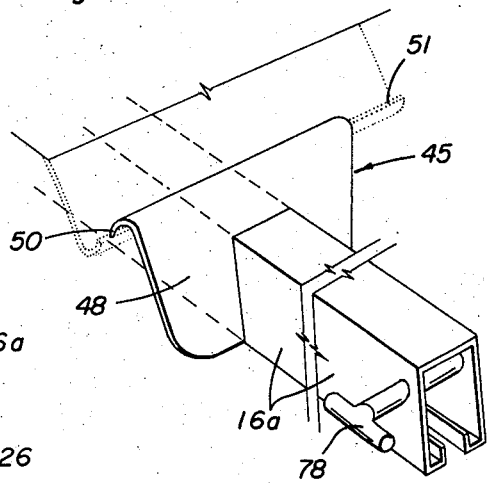
FIG. 8 is a fragmentary perspective view of that part of the track which projects laterally from the right-hand side of the automobile, the said track being broken to shorten the length for convenience of illustration.
Figure 9:
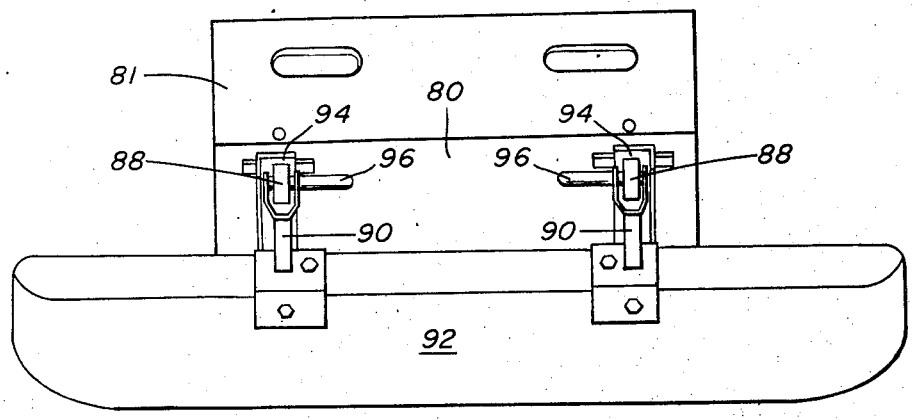
FIG. 9 is a view, as seen from the rear of the automobile, showing the rear bumper with its upstanding brackets, and the wheeled pallet of the present invention, upon which the folded-up wheel-chair is laid when it is loaded into the car trunk.
Figure 10:
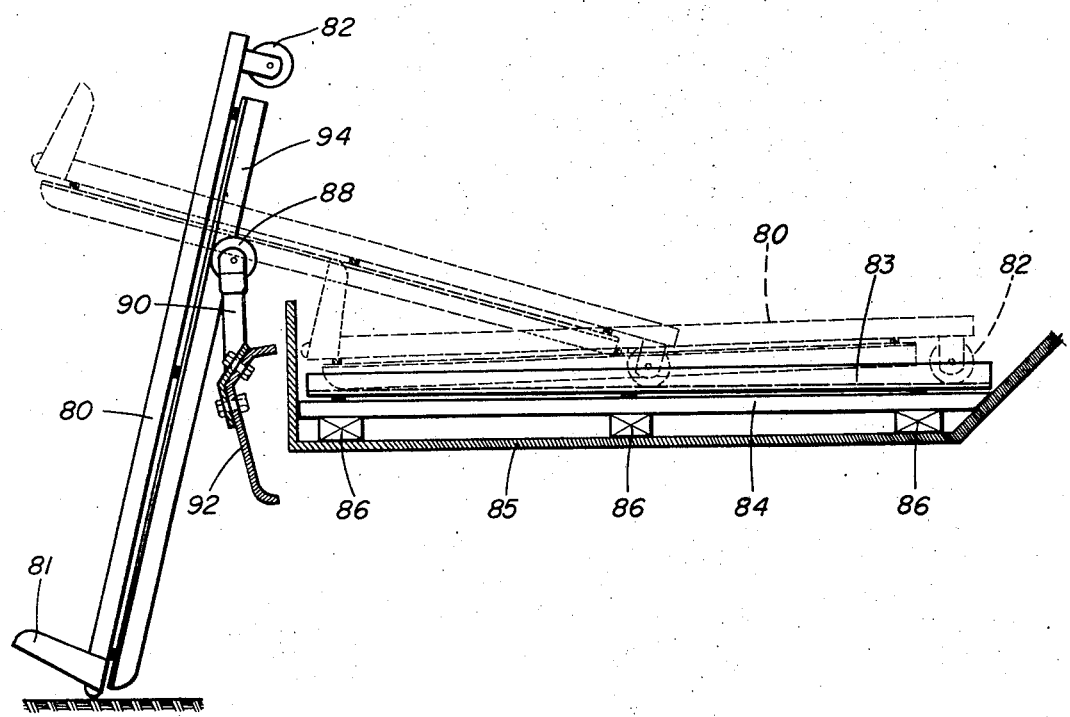
FIG. 10 is a fragmentary sectional side view of the truck compartment and rear bumper of the automobile, showing the wheeled pallet in three positions.
Figure 11:
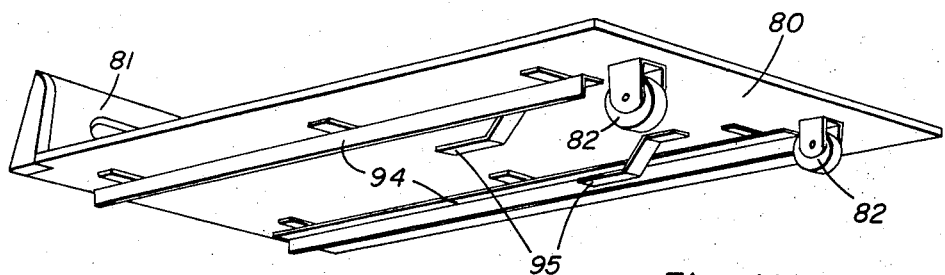
FIG. 11 is a perspective view, as seen from below and to one side of the front edge, showing the underside of the wheeled pallet.
Figure 12:
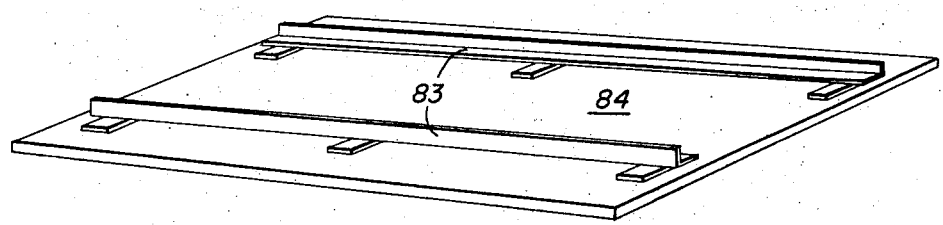
FIG. 12 is a perspective view of the platform having tracks for the wheels of the pallet, which is placed on the floor of the car trunk.
Figure 13:
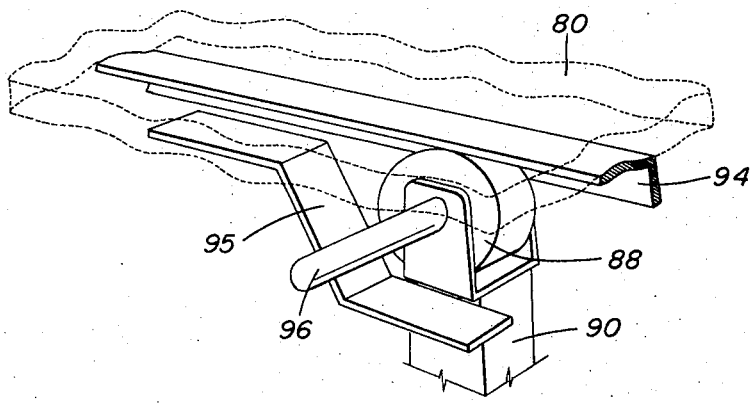
FIG. 13 is an enlarged fragmentary perspective view of a structural detail, showing how the rearwardly facing hook on the underside of the pallet engages a limit stop on the bumper-mounted bracket, to limit the rearward movement of the pallet and serve as a pivot, about which the pallet swings when its rear end is lowered to the ground.

The track 16 is adapted to be clamped to the roof of the automobile 44 by means of clamps 45 and 46, each of which consists of a plate 48 of heavy gauge sheet steel having a curled-over lip 50 at the top edge thereof, which seats in the rain gutter 51 of the car top, as best shown in FIGS. 6 and 8. Plate 48 of clamp 45 is welded or otherwise fixed to the track section 16a so that its lip 50 seats in the gutter 51 on the right-hand side of the automobile directly over the seat 52. Clamp 46, on the other hand, is adjustably clamped to track section 16b so that it can be shifted along the length of the latter to enable it to be secured to the car roof, and also to accommodate itself to the varying widths of different automobiles. To this end, clamp 46 is provided on its plate 48 with an aperture surrounded by a rectangular collar 53, through which track section 16b passes loosely. A clamping screw 54 is screw-threaded through a flange 55 projecting horizontally inward from the inner side of plate 48 directly below collar 53, and the top end of the screw bears against the bottom of track section 16b to lock the clamp 46 to the track.

The wheeled carriage 17, which runs on track 16, is best shown in FIG. 3, where it will be noted that the carriage comprises an elongated body member 56 in the form of an inverted T-shaped bar, that is preferably machined or extruded of aluminum alloy. The vertical web of the bar 56 is of a width to pass freely between the upstanding edges 30 of the track 16, and fixed to the top edge of the web are two journal blocks 58 in which axles for two pairs of wheels 60 are held. The wheels 60 run on the track flanges 28 of track 16, as best shown in FIG. 4. It will be noted that one of the pairs of wheels 60 is located at one end of the bar 56, while the other pair is located a little more than halfway toward the other end. The reason for this will become apparent hereinafter.

Mounted on the bottom of bar 56 at the said other end thereof is the winch 18, the inverted U-shaped frame 62 of which is secured by bolts 63 extending downwardly through the web 56 from the topside thereof. Disposed between the side flanges of the frame 62 and rotatably supported thereon is a cylindrical drum 64 which is connected by gearing (not shown) to a hand-crank 65. The wire rope 19 is attached at one end to the drum 64 and is wound thereon when the crank 65 is turned. The winch 18 is self-locking so that if the handcrank 65 should be released, it will not allow the invalid in the sling 22 to drop.

Wire rope 19 extends from drum 64 inwardly along the bottom side of the bar 56, and passes over a pulley 66 which is rotatably supported between two bracket plates 68 fixed to opposite sides of the bar 56 and extending downwardly therefrom. The wire rope passes under a pulley 70 rotatably supported between the arms of a U-shaped strap 72, and back up to an anchorage attachment 73 on the underside of bar 56. Hook 20 is connected to the U-shaped strap 72 by a ring 74. The hook is adapted to hook onto loops 75 at opposite sides of the canvas sling 22 in which the invalid sits, and when the hook is raised by winch 18, the sling, and the invalid sitting in it, are raised from either the car seat 52 or the wheel-chair 76, as the case may be. When the invalid is thus supported by the sling, his weight is more/or less centered between the wheels 60, so that each pair of wheels carries approximately the same weight. The carriage 17 is prevented from running off the outer end of the track 16 by means of a limit stop pin 78, which passes through aligned holes in opposite sides of the track section 16a at the outer end thereof, said pin being located in the path of the carriage to that the latter runs into the pin at the outer end of its travel.

The operation of the hoist is as follows: Assume first that the invalid is seated in the wheel-chair 76, with the canvas sling 22 passing under his buttocks and thighs. The two track segments 16a and 16b are joined together at 32, and the track is passed laterally through the passenger compartment of the automobile, through the open door on the near side and the open window on the far side. Usually, this will be through the door on the right-hand side of the car and the window on the left-hand side. The clamps 45 and 46 are then secured on the rain gutters 51, using the screw clamp 54 on the clamp 46. Carriage 47 is then shifted to the outer end of the projecting portion of track 16 and the wheel-chair 76 is maneuvered to place it directly under the hook 20. Winch handle 65 is then cranked in the direction to lower the hook until it can be hooked through loops 75 on the sling. The winch handle is now cranked in the direction to raise the invalid clear of the wheel-chair, after which the carriage 17 is pushed inwardly along track 16 until the invalid is positioned above the desired point on the car seat 52. The winch is next operated to lower the sling and invalid to the car seat, where the hook 20 is disengaged from the loops 75. The track is then removed from the car roof, broken down into the two separate sections 16a and 16b, and stored in the car trunk. To transfer the invalid from the car seat to the wheel-chair, the entire procedure is reversed.

The apparatus to this point is the invalid-transfer device, which is the subject matter of our prior application. The present application is concerned with the apparatus for loading the folded-up wheel-chair into the car trunk after the invalid has been transferred into the seat 52. This is shown in FIGS. 1, and 9 to 13, inclusive, to which attention is now directed.

Wheel-chair 76 is a conventional folding chair of a well-known type, which folds into a relatively flat, compact bundle for storage or for transport in a car.

The folded-up wheel-chair is laid flat against a tilted pallet 80, as shown in FIG. 1, with the bottom of the wheel-chair resting on a shelf 81 projecting perpendicularly from the bottom edge of the pallet. Pallet 80 is preferably made of a plywood panel, and fixed to the underside of the panel at its top, or front, end, is a pair of laterally spaced wheels 82. The wheels 82 are adapted to run on a pair of laterally spaced, fore and aft extending tracks 83, which are mounted on a plywood platform 84 that rests on the bottom 85 of the trunk compartment. The platform 84 is braced by transverse cleats 86 fixed to the underside thereof. The tracks 83 may conveniently be formed by lengths of angle iron, one flange of which is parallel to the top surface of the platform 84, and the other projecting upwardly, perpendicular to the platform, on the outside of wheels 82.

The pallet 80 is also supported in part during the loading and unloading operation by a pair of laterally spaced wheels 88 which are rotatably supported by brackets 90 that are clamped to and project upwardly from the rear bumper 92. Wheels 88 run on tracks 94 fixed to the underside of the pallet 80. Tracks 94 are also conveniently made of angle irons, with their vertical flanges lying outside of the wheels 88.

To limit rearward movement of the pallet 80 when it is being pulled out of the trunk compartment, so that it will not come out altogether and drop its front end onto the ground, the pallet is provided with two laterally spaced, rearwardly facing hooks 95, on its under side alongside the tracks 94, and these are adapted to engage limit stop projections 96, which extend laterally inward from the brackets 90 on the axes of the wheels 88. When the hooks 95 catch on the limit stops 96, the rear end of the pallet is lowered to the ground, and the pallet swings about the limit stop 96 as a pivot. Wheels 88 also serve as pivots for the pallet, as their axes are aligned with the axes of the limit stops 96.

The folded-up wheel-chair is placed on the pallet 80 when the latter is positioned as shown in FIG. 1. The bottom edge of the pallet is next raised up until wheels 82 touch the tracks 83 on platform 84, as shown in the intermediate position in FIG. 10. The pallet is then pushed forwardly into the trunk compartment, riding on wheels 82 at its front end and on wheels 88 which support its rearward end. As the pallet reaches the forward end of its travel, the rear end runs off the wheels 88 and drops (or is lowered) into the trunk well. The trunk lid can now be closed.

While we have shown and described in considerable detail what we believe to be the preferred embodiment of the invention, it will be understood that the invention is not limited to such details, but may take various other forms within the scope of the claims that follow.

We claim:

1. A loader for loading the folded-up wheelchair of an invalid into the trunk compartment of an automobile, said loader comprising a pallet upon which said folded-up wheelchair is laid, said pallet being adapted to be carried within said trunk compartment and to lie flat on the trunk floor;
    a pair of laterally spaced wheels rotatably supported on the underside of said pallet at the front end thereof;
    a pair of laterally spaced brackets removably affixed to the rear bumper of the automobile adjacent the trunk opening near the lower edge thereof, said brackets extending upwardly therefrom to position said rollers slightly above the rear opening of the trunk compartment;
    rollers on said brackets which engage the underside of said pallet and provide rolling support therefor as the pallet is moved into or out of said trunk compartment;
    the axles of said rollers extending laterally to form stub shafts that act as limit stop projections;
    means for limiting the rearward movement of said pallet to a given partially-withdrawn position, for preventing said pallet from being pulled completely out of the trunk, and dropped onto the ground, and for positioning said pallet so that it may be pivoted to have its rear end come to rest on the ground;
    said movement-limiting means comprising said stub shafts and rearwardly-facing hooks positioned on the underside of said pallet;
    said hooks being engageable with said limit stop projections to position said pallet in said partially-withdrawn position;
    whereby said pallet may be partially withdrawn from said trunk by pulling it rearwardly in a substantially horizontal position, or may be pushed forwardly in a substantially horizontal position, with a minimum of strength as said substantially horizontal pallet is supported at its front end by said laterally spaced wheels, and is supported near its rear end by said rollers;
    means for pivoting the partially withdrawn pallet so that its rear end comes to rest on the ground;
    said pivoting means comprising said rearwardly facing hooks, said stub shafts, and said rollers -- all of which are substantially coaxial when said pallet is in its partially-withdrawn position;
    whereby said pallet may be pivoted upward or downward with a minimum of strength, as practically the entire weight of the pallet and its load is supported by said pivoting means.

2. A loader as set forth in claim 1 which further includes a pair of tracks on the underside of said pallet, which are spaced apart laterally to allow said rollers on said brackets to roll thereon.

3. The loader of claim 1 including shelf means, positioned at the upper rear end of said pallet, for receiving a load such as a folded wheelchair.

4. A loader for loading the folded-up wheelchair of an invalid into the trunk compartment of an automobile, said loader comprising a pallet upon which said folded-up wheelchair is laid, said pallet being adapted to be carried within said trunk compartment and to lie flat on the trunk floor;
    a pair of laterally spaced wheels rotatably supported on the underside of said pallet at the front end thereof;
    a pair of laterally spaced brackets fixed to said automobile adjacent the trunk opening near the lower edge thereof;
    rollers on said brackets which engage the underside of said pallet and provide rolling support therefor as the pallet is moved into or out of said trunk compartment;
    a pair of laterally spaced, fore-and-aft extending tracks on the floor of said trunk, upon which said wheels roll;
    said brackets being fixed to the rear bumper of the automobile and extend upwardly therefrom;
    a pair of tracks on the underside of said pallet, which are spaced apart laterally to allow said rollers on said brackets to roll thereon; and
    rearwardly facing hook means on the underside of said pallet engageable with limit stop means on the automobile to limit rearward movement of said pallet as the latter is pulled out of the trunk;

said limit stop means including laterally extending limit stop projections on said brackets, said limit stop projections being stub/shafts which are coaxial with said rollers, said limit stop projections being engaged by said hooks on said pallet and cooperating with said rollers to serve as pivots for the pallet as the rear end of the latter is swung down to the ground.

* * * * *

UNITED STATES PATENT OFFICE
CERTIFICATE OF CORRECTION

Patent No. 3,807,592            Dated     April 30, 1974

Inventor(s)   Ray E. Lynn and Dwane P. Simmons

It is certified that error appears in the above-identified patent and that said Letters Patent are hereby corrected as shown below:

on the first page, the address of Ray E. Lynn should be:

5172 Acacia Street
    San Bernardino, California 92407

Signed and sealed this 10th day of September 1974.

(SEAL)
Attest:

McCOY M. GIBSON, JR.                C. MARSHALL DANN
Attesting Officer                   Commissioner of Patents